June 17, 1952  J. VANACKER  2,600,942
VENTED MOLD FOR THE MANUFACTURE OF FOOTWEAR
Filed June 28, 1949  2 SHEETS—SHEET 1
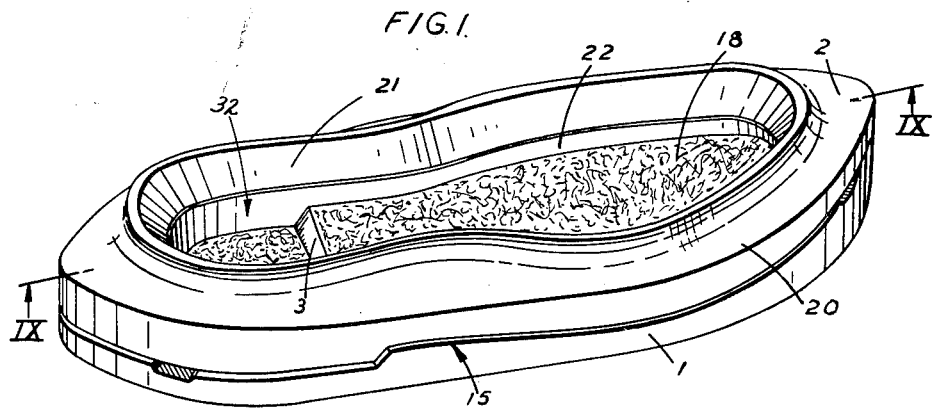
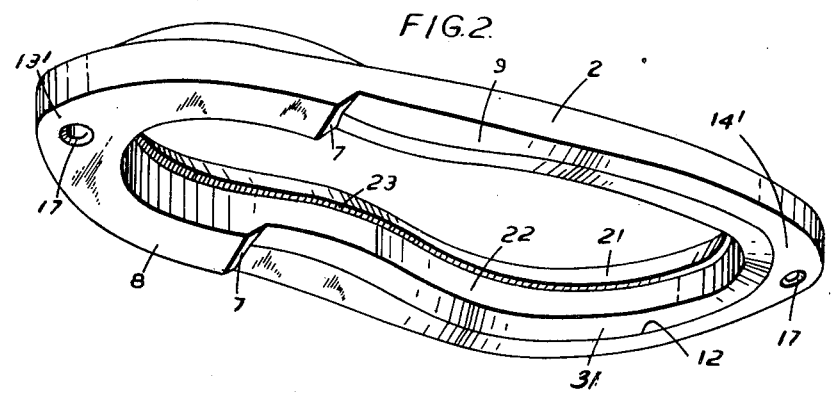
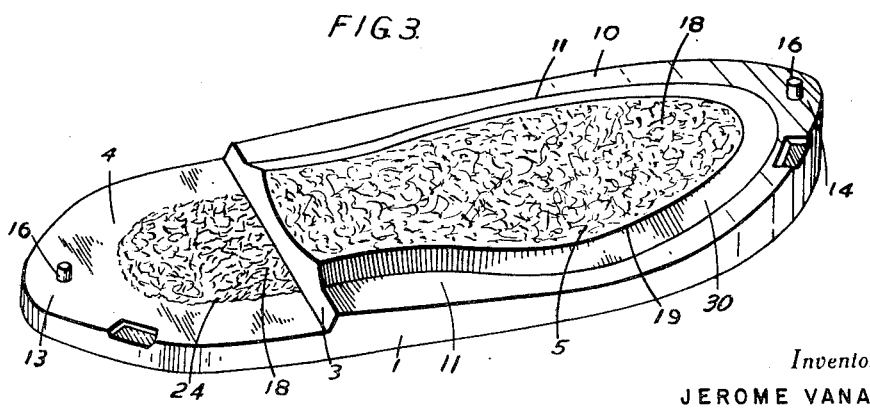
*Inventor*
JEROME VANACKER
*Attorney*

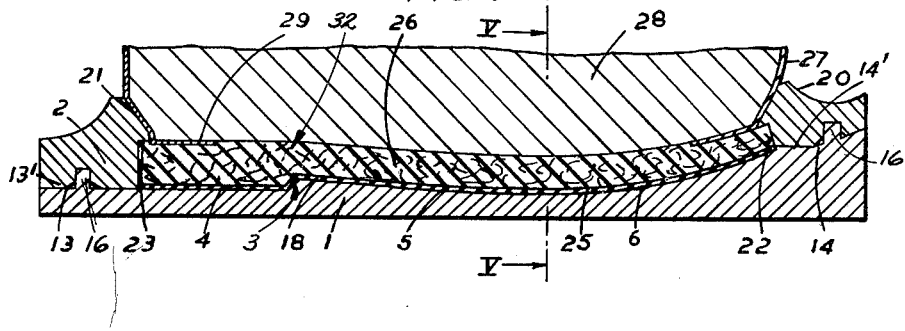
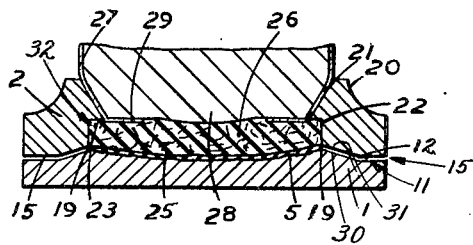
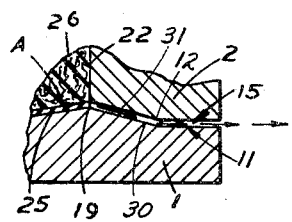

Patented June 17, 1952

2,600,942

UNITED STATES PATENT OFFICE 2,600,942

VENTED MOLD FOR THE MANUFACTURE OF FOOTWEAR

Jerome Vanacker, Assche-lez-Brussels, Belgium

Application June 28, 1949, Serial No. 101,709
In Great Britain June 30, 1948

8 Claims. (Cl. 18—34)

This invention concerns improvements in the manufacture of footwear, e. g. shoes, slippers, and the like, and the invention has particular reference to the method of manufacture, and molds for use with this method of manufacture, in which a sponge rubber bottom is molded and vulcanised on to an upper in a single operation, this securing of the bottom to the upper and the vulcanising of the bottom being achieved by employing a mold comprising a base plate and a frame adapted to be superposed on this base plate, the frame and the base plate defining between them a molding cavity in which the said bottom is molded and vulcanised on to a lasted upper, this lasted upper being pressed into said frame so as to project into the said molding cavity and into engagement with rubber material (containing a sponging agent) placed within such molding cavity and which material is adapted ultimately to form the said bottom, said assembly being heated so as to effect a sponging of the rubber bottom-forming material which effects the expansion of the said rubber material and the bringing of such material into close engagement with the said upper and the molding of the bottom to the required shape, whilst the continued heating effects the final vulcanisation of the molded bottom to the upper. The invention is especially applicable to the manufacture of footwear by the above described method where the bottom is formed in two layers, a sponged relatively thick upper layer and a denser or unsponged relatively thin lower layer serving to provide the wearing surface for the bottom.

Hitherto in the production of footwear by the method above described it has been found that there has been a wastage of between 20% and 30%, this percentage of the total footwear produced usually being a complete loss. This has naturally increased the selling price of the satisfactory footwear produced by the method and it is the object of this invention to provide an improved method and means of the kind hereinbefore referred to whereby the aforementioned very serious wastage can be eliminated or considerably reduced.

According to this invention a mold is provided for use in the manufacture of footwear as above described, such mold comprising a base plate and a frame adapted to be superposed upon such base plate and shaped so as to define therewith a molding cavity for molding the said bottom to the required shape; said frame being internally shaped to fit snugly around the part of the lasted upper to be vulcanised to the said sponge rubber bottom whilst permitting such part of the upper to project into the molding cavity; the said frame and base plate also being so shaped on opposed marginal surfaces that the one has a continuous ridge and the other a continuous depression around at least the greater part of the perimeter thereof, said depression being adapted to receive the said ridge therein when the said frame and base plate are superposed in operative relationship; co-operating spacing means on the said frame and base plate for ensuring that the opposed surfaces of the said ridge and the said depression of the superposed frame and base plate will be maintained in closely spaced relationship so as to define between the frame and base plate, around the said molding cavity and adjacent the said base plate, a perimetrical substantially continuous gap leading outwardly from the said molding cavity and adapted to permit the controlled but restrained outward escape from the said molding cavity of gases generated therein during the heating and vulcanising of the said rubber bottom.

According to a further aspect of the invention the said mold comprises a base plate and a frame adapted to be superposed upon said base plate and to define therewith a molding cavity for molding the said bottom to the required shape, said frame also being internaly shaped to fit closely around the part of the upper to be vulcanised to the said bottom whilst also permitting such part of the upper to project into the said molding cavity for engaging with an unvulcanised rubber mass placed therein for attachment to the upper, the said base plate having the molding surface portion thereof which is adapted to mold the wearing surface of the said bottom curved upwardly towards it perimeter, the marginal part of the base plate being chamfered off downwardly and outwardly from and beyond the perimeter of the said molding surface portion, and the marginal under-surface of the said frame being upwardly and inwardly bevelled at its inner part at an angle corresponding to that of the outwardly and downwardly chamfered surface of said base plate; means for supporting the said frame on the said base plate in predetermined spaced relationship so that, when the frame is superposed on the base plate, the said inwardly bevelled surface of the frame is immediately opposed, and closely spaced with reference to, the correspondingly chamfered surface of the base plate so as to define therewith a shallow perimetrical gap leading outwardly from the said molding cavity and adapted to permit controlled but restrained outward escape from said molding cavity to the atmosphere along substantially the whole perimeter of the mold, of sponging gases generated in the mold during the heating and vulcanising of the said rubber bottom.

According to a further feature of the invention the said molding surface of the said base plate is scored to provide a roughening on the molded surface of the said bottom, such scorings extending to the crest of the said upwardly curved part of the said base molding surface and the relief portions of such scorings extending towards the said frame at the said crest of the base plate so as to restrict the said perimetrical gas escape gap at such crest and to assist in breaking up and causing turbulence in gases escaping from the said molding cavity through the said escape gap.

Preferably the said gas escape gap is of a V-shaped or shallow substantially zig-zag cross-sectional form.

It is found that, when using a mold as above described, the aforesaid wastage (which has hitherto been a natural corollary of the method hereinbefore referred to) is eliminated or very greatly reduced and the footwear produced is of an improved character, greater precision being achieved in the products than has hitherto been secured. These improved results are due to the restrained and controlled escape of the sponging gases achieved by the use of the method and means of this invention, a retardation of the escape of gases being secured by permitting them to escape through the perimetrical continuous slit-like gap in which the gases meet some resistance to their outward flow by reason of the turbulence produced in the gases by their deflection, at least once, from their initial direction of travel from the mold cavity.

The said controlled and restrained escape of the sponging gases is so chosen that the pressure within the molding cavity is maintained (whilst the rubber in the cavity is in an expansible condition) at a value sufficient to ensure that the rubber is driven into close relationship with the upper, e. g. into the pores or interstices of a cloth upper, to ensure a firm and permanent union of the bottom and the upper. Permitting the escape of the sponging gases from the mold in a perimetrically substantially continuous stream around the edge of the molding cavity and adjacent the wearing-surface-molding face thereof, also contributes to the improved results obtained and this seems to be particularly the case where the bottom is formed in two layers vulcanised together, one layer being a well sponged layer and the other a considerably denser, or relatively hard, and thin wearing layer, since the controlled escape gap seems to avoid the accumulation of gases between the two superposed layers of the bottom and permits these layers to make sound contact with one another and to be firmly vulcanised together.

It will be understood therefore, that the substantially continuous gas escape around the molding cavity of the mold acts rather in the manner of a regulating valve which controls and restrains the escape of the gases from the mold.

The mold of this invention may be made of any convenient material but a sand casting from aluminium is found to be particularly opposite, being cheap, easily produced, and light so that it can be handled easily by girl operatives. In addition, leaving the opposed gap defining surfaces at least of the cast mold parts unsmoothed and unmachined in any way, is found to favour the desired restrained or restricted gas escape effect, quite apart from the saving in production costs which this represents.

Other features of the invention will become apparent hereinafter in the specification and claims.

The invention will now be described with reference to the accompanying drawings illustrating one form of mold according to the invention and with which the method of the invention may be performed.

Figure 1 is a perspective view of the complete mold with the component parts thereof assembled together.

Figure 2 is a perspective view of the underside of the top half or frame of the mold of Figure 1.

Figure 3 is a top perspective view of the lower half or base plate of the mold.

Figure 4 is a section on IV—IV of Figure 1, but showing a lasted upper and the bottom-forming rubber mass in the mold.

Figure 5 is a section on V—V of Figure 4 with the upper and bottom-forming mass present, and Figure 6 is an enlarged detail of Figure 5.

The mold illustrated comprises two main parts, viz. a base plate 1 somewhat of a boat shape and a frame 2 which is mounted on, and interfits with, the base plate. Both these two parts, which are separable (see Figures 2 and 3), are formed as sand castings of aluminum which, at least at their contact surfaces and preferably at other parts as will be hereinafter mentioned, are left in their condition as foundry sand castings, i. e. are not subjected to machining or other smoothing treatment.

As will be observed from the drawings, the mold is used to produce a complete bottom including an arched portion between the heel and the sole or forepart, the base plate 1 having an inclined shoulder 3 at the junction between these two parts. In the example shown in the drawings the upper surface 4 of the base plate is, to the rear of the shoulder 3 substantially flat, whereas forward of this shoulder the surface 5 of the base plate 1 is of longitudinally curved profile (see Figure 4), having in the longitudinal direction a depression 6 corresponding to the ball of the foot. The upper surface 4 of the base plate 1 is also concave in a transverse direction as is clearly seen from Figure 5. Thus the bottom-molding surface of this part of the mold is curved upwardly towards and around its entire perimeter, this upwardly curved part of the base plate terminating in a perimetrical crest 19.

The frame 2 is shaped at its lower side in a manner corresponding to that of the base plate so as to mate with the latter when mounted in position thereon, as in Figures 1, 4 and 5. Hence it has a pair of inclined shoulders 7 adapted to be applied against the end portion of the shoulder 3 of the base plate and, to the rear of the shoulders 7, a part 8 of horseshoe appearance corresponding to the margin of the base plate surface 4, whilst at the forepart the frame 3 has a lower surface 9 which follows the contour of the marginal part 10 of the upper surface 5 of the base plate.

This surface part 10 is of grooved form throughout its length, the groove 11 in question being of shallow V-shape in cross section (see Figures 5 and 6), and the surface 9 of the frame 2 is formed with a perimetrical projection 12 of correspondingly ridged form which nests in the groove 11 when the two mold parts are applied together.

Thus from the crest 19 at the perimeter of the sole molding part of the base plate 1, the base plate has a perimetrical surface 30 of outwardly and downwardly chamfered form extending to the bottom of the groove 11 in the base plate, the surface 30 thus forming the inner wall of the perimetrical groove 11 of the base plate.

As the lower surface 9 of the frame 3 is shaped to follow the contour of the marginal part 10 of the upper surface 5 of the base plate 1, this lower surface of the frame is consequently upwardly and inwardly bevelled at its inner part 31 (Figure 5) at an angle corresponding to that of the outwardly and downwardly chamfered surface 30 of the base plate 1, this bevelled part 31 forming the inner side of the perimetrical ridge 12 of the frame 2 and which ridge nests in the groove 11, the outer side of the said ridge being adapted to lie substantially parallel with the outer side of the groove 11 in the base plate 1 over which side it directly lies when the two parts of the mold are superposed as shown. The front and rear end portions, 13, 13' and 14, 14' of the mold parts are so formed, however, that when the mold halves are applied together there is surface contact between these end portions prior to contact occurring between the other face-to-face parts of the mold frame and base plate, thus leaving a shallow slit-like substantially continuous perimetrical gap 15 between the marginal portions of the frame 2 and the base plate 1, this gap being destined to permit the escape of sponging gases from the molding cavity 32 of the mold in which the bottom is molded, this gas escape being permitted at the perimeter of the molding cavity adjacent the bottom surface thereof and in an outwardly directed stream which extends substantially continuously around the sole-forming part of the mold.

The end portions 13, 13' and 14, 14' of the base plate and frame respectively are so constructed that when the frame and base plate are placed together the gas escape gap 15 defined between the marginal portions of the frame and the base plate is such as only to permit the sponging gases to escape from the mold cavity 32 during the sponging and vulcanising part of the process at a rate sufficient to prevent the rubber mass being spewed from the mold, particularly upwardly between the lasted upper and the frame 2, whilst maintaining the internal gas pressure at such a level as to ensure that the rubber in the molding cavity will be expanded so as to be molded to the required shape and also so as to be forced into the pores or interstices of the upper before being vulcanised thereto, thereby ensuring that an enduring and adequate bonding of the upper and bottom is attained.

It will be seen that, in the mold, there are virtually two parallel barrier ridges 19 and 12 extending perimetrically around the surface portion 5 of the base plate which impede the flow of the escaping gases outwardly from the molding cavity, the gas escape gap 15 being of a relatively flat or shallow zig-zag form in cross-section.

After the initial application of heat which initiates the sponging of the rubber mass and then the partial vulcanisation of the rubber, the escape of gas then commencing is insufficient to cause the partially vulcanised rubber mass to enter the escape gap 15 and consequently no flash or no appreciable flash is formed around the lower edge of the bottom. The outward spewing of the rubber mass is also obstructed by the perimetrical upward curving of the part 5 of the base plate 1.

The end portions 13, 13' and 14, 14' have a rolling surface contact permitting a slight amount of rocking of the frame 2 relatively to the base plate 1 so that the relative size of the gap 15 at the two sides of the mold is capable of a slight adjustment, if required.

At its front and rear end portions, 13 and 14 respectively, the base plate is furnished with upstanding studs 16 which co-operate with chamfered edged recesses 17 in the portions 13' and 14' of the frame 2 to correctly register the two interfitted mold parts together.

At the part thereof corresponding to the heel of the footwear bottom, the surface 4 of the base plate is indented or otherwise formed with scorings 18 which provide a pattern on the underside of the finished sole. The surface 5 of the base plate is similarly treated at the part corresponding to the sole of the bottom, and it will be noted that the scorings extend right to the edge of this part of the plate, that is right up to the crest of the ridge 19 which will consequently be of an irregular or interrupted character instead of in the form of a continuous line as is shown in, for example, Figure 3 of the drawings, it not being practical to show the broken character of this line in such a drawing. The relief portions of the said scorings extend at the crest 19 at the base plate 1 towards the frame 2 and, at this position, restrict the said perimetrical gas escape gap 15 and assist in breaking up and causing turbulence in gases escaping outwardly from the molding cavity through the escape gap.

The frame 2 has flared outer and inner surfaces 20 and 21 respectively, and an undercut portion 22 forming a shoulder 23 (Figure 2) and, in the assembled condition of the mold, the vertical surface of the undercut portion 22 of the frame registers with the crest 19 of the base plate 1 throughout the forepart of the latter and at the rear part registers with edge 24 defining the heel. The surfaces 21, 22 and the inner surface of the shoulder 23 are preferably furnished (e. g. by machining) with a smooth finish since they contact the upper, and the edges of the sole respectively, as will hereinafter appear.

In use, the mold frame 2 is placed over the base plate 1 these parts being registered together by the pins 16 and recesses 17.

The rubber mass for molding the sole is separately prepared by calendering together two sheets of rubber stock, an upper one consisting of a mix including a sponging agent and which, when heated, is designed to expand or sponge and a lower one of a composition which, on being heated, will form a harder or denser wearing surface or layer united to the underside of the said upper layer.

As an example, I may mention that the upper layer may comprise mixtures of 35% to 80% rubber and 65% to 20% fillers and other additional materials commonly employed, including the substances adapted to produce the sponging gas on heating, and that the lower sheet may comprise for instance 45% rubber and 55% of fillers and additional materials. It will be understood that these percentages, which are given by weight, may be varied according to requirements.

The relative thickness of the upper and lower sheets or layers will also vary, depending on the materials employed, the particular kind of shoe or the like being made, and the use for which the latter is destined.

The composite sheet so formed is then cut into blanks each of a size corresponding approximately to the size of the mold and is placed therein so as to occupy the molding cavity defined by the upper surface of the base plate 1 and the wall 22 and shoulder 23 of the frame 2, the lower layer 25 of the blank being engaged with the upper surface of the base plate 1 and the upper layer 26 extending approximately to the level of the shoulder 23 of the frame. The thickness of the lower layer 25 will have been so selected that the junction between the two layers is adjacent the upper side of the gap 15 between the frame 2 and the base plate 1.

The upper 27, mounted upon a last 28 is then introduced into the opening in the frame 2, and is secured in the latter with the lower side portions of the upper bearing against the surface 21 of the frame and the inturned edges 29 of the upper in contact with the layer 26 of the said blank. Clamping means may be employed to maintain the last in this position and the setting of such means may be used to adjust the relative width of the gaps 15 at each side of the mold.

The mold is then heated to vulcanising temperature by any convenient means, for instance by placing the mold on a vulcanising table or by the use of electrical heating elements (not shown) in the base plate itself. A vulcanising temperature of 90° to 160° C. is satisfactory. The heating period will be chosen so as to be sufficient to effect the desired results, and will depend on the accelerator employed.

During the heating the gases developed in the rubber layer 26 cause the latter to be sponged and to swell to fill the molding cavity of the mold and simultaneously this layer 26 will be vulcanised to the edges 29 of the upper 27 and to the layer 25 so as to form a composite sole molded and secured to the upper as a result of this single heating operation.

It has been discovered that the aforesaid sponging gases would, but for this invention, tend to form at the junction of the layers 25 and 26 bubbles which would hinder the vulcanising of these layers together under the heating effect and produce an inefficient bonding of these layers in the final product. In the mold described, however, the gases accumulating at the junction of layers 25 and 26 are allowed to escape through the gap 15 as indicated by the arrows in Figure 6.

Too rapid and unrestricted escape of the sponging gases results in an unsatisfactory product. However, with a mold as above described wherein the gas escape gap 15 has an angled cross-sectional shape (see Figures 5 and 6), the sole-forming portion 5 of the base plate is concave and curves upwardly to the crest of the ridge 19, and wherein the scoring or serrations of the said sole-forming portion project towards the frame 2 along the said ridge 19, a restraint or restriction is placed on the outward flow of the escaping gases which undergo at least two changes in their direction of flow before leaving the mold, turbulence being produced in the gases which further somewhat retards their flow from the mold. Thus the outflow of the gases in what may be referred to as a radial direction, i. e. substantially normal from the perimetrical edge of the part 5 of the mold at any point, is restrained and controlled.

Hence it is found, using the mold as described, that a shoe or the like is formed with the sole integrally molded and bonded to the upper, and with a satisfactory wear surface, quickly and effectively and without the need for any special preliminary molding or processing of the bottom, excepting the calendering of the composite sheet which can be done quickly on a large scale without special molding equipment. In addition it will be understood that molds as described can be produced cheaply (especially where unpolished sand castings from aluminum are employed) and that a large number can be used simultaneously in a vulcanising press or on a vulcanising table for mass production purposes, and finally the mould of this invention enable the footwear to be produced efficiently without any appreciable wastage which thereby enables the cost of the footwear to be reduced and the efficiency of the plant greatly increased.

I claim:

1. A mold for use in the manufacture of an article of footwear comprising an upper and a sponge rubber bottom vulcanised to such upper; such mold comprising a base plate and a frame adapted to be superposed upon such base plate and shaped so as to define therewith a molding cavity for molding the said bottom to the required shape; said frame being internally shaped to fit snugly around the part of the lasted upper to be vulcanised to the said sponge rubber bottom whilst permitting such part of the upper to project into the molding cavity; the said frame and base plate also being so shaped on opposed marginal surfaces that the one has a continuous ridge and the other a continuous depression around at least the greater part of the perimeter thereof, said depression being adapted to receive the said ridge therein when the said frame and base plate are superposed in operative relationship; co-operating spacing means on the said frame and base plate for ensuring that the opposed surfaces of the said ridge and the said depression of the superposed frame and base plate will be maintained in closely spaced relationship so as to define between the said frame and base plate, around at least the sole portion of the said molding cavity and adjacent the said base plate, a perimetrical substantially continuous gap leading outwardly from the said molding cavity and adapted to permit the controlled but restrained outward escape from the said molding cavity of gases generated therein during the heating and vulcanising of the said rubber bottom.

2. A mold according to claim 1, wherein the opposed marginal surfaces of said frame and base plate are so shaped that the said escape gap defined between them when the frame and base plate are superposed, is of a V-shaped cross-sectional form.

3. A mold according to claim 1, wherein the said opposed marginal surfaces of said frame and base plate are so shaped that the said escape gap defined between them when the frame and base plate are superposed, is of a shallow substantially Z-shaped cross-sectional form.

4. A mold according to claim 1, wherein the said spacing means for the said frame and base plate consist of co-operating bearing surfaces provided at the opposite ends only of the frame and base plate respectively.

5. A mold according to claim 1, in which the said frame and base plate are formed as aluminium sand castings and are unsmoothed at their marginal gas escape gap defining surfaces.

6. A mold for use in the manufacture of an article of footwear comprising an upper and a sponge rubber bottom vulcanised to such upper; such mold comprising a base plate and a frame adapted to be superposed upon said base plate and to define therewith a molding cavity for molding the said bottom to the required shape, said frame also being internally shaped to fit closely around the part of the upper to be vulcanised to the said bottom whilst also permitting such part of the upper to project into the said molding cavity for engaging with an unvulcanised rubber mass placed therein for attachment to the upper; the said base plate having the molding surface portion thereof which is adapted to mold the wearing surface of the said bottom curved upwardly towards its perimeter, the marginal part of at least the sole portion of the base plate being chamfered off downwardly and outwardly from and beyond the perimeter of the said molding surface portion, and the marginal under-surface of at least the sole portion of the said frame being upwardly and inwardly bevelled at its inner part at an angle corresponding to that of the outwardly and downwardly chamfered surface of said base plate; means for supporting the said frame on the said base plate in predetermined spaced relationship so that when the frame is superposed on the base plate, the said inwardly bevelled surface of the frame is immediately opposed, and closely spaced with reference to, the correspondingly chamfered surface of the base plate so as to define therewith a shallow perimetrical gap leading outwardly from the said molding cavity and which is adapted to permit controlled but restrained outward escape from said molding cavity to the atmosphere along substantially the perimeter of at least the sole portion of the mold, of sponging gases generated in the mold during the heating and vulcanising of the said rubber bottom.

7. A mold according to claim 6, wherein the said molding surface of the said base plate is scored to provide a roughening on the molded surface of the said bottom, such scorings extending to the crest of the said upwardly curved part of the said base plate molding surface and the relief portions of such scorings extending towards the said frame at the said crest of the base plate so as to restrict the said perimetrical gas escape gap at such crest and to assist in breaking up and causing turbulence in gases escaping from the said molding cavity through the said escape gap.

8. A mold for use in the manufacture of an article of footwear comprising an upper and a sponge rubber bottom vulcanised to such upper, such mold comprising a base plate and a frame adapted to be superposed upon said base plate and to define therewith a molding cavity for molding the said bottom to the required shape, said frame also being internally shaped to fit closely around the part of the upper to be vulcanised to the said bottom whilst also permitting such part of the upper to project into the said molding cavity for engaging with an unvulcanised rubber mass placed therein for attachment to the upper, wherein those marginal surfaces of said frame and base plate which are opposed when these parts are in operative superposed relationship are shaped to define between them a shallow escape gap for gases generated within the said molding cavity during the bottom sponging and vulcanising operation, such escape gap extending substantially continuously perimetrically around at least the sole portion of said molding cavity and outwardly therefrom to the outer edge of the mold, and said escape gap having such a cross-sectional form as to effect at least one change of direction in the flow of the escaping gases as they pass outwardly through the escape gap, whereby the rate of escape of said gases is restricted.

JEROME VANACKER.

REFERENCES CITED

The following references are of record in the file of this patent:

UNITED STATES PATENTS

| Number | Name | Date |
|---|---|---|
| 379,450 | Coughlin | Mar. 13, 1888 |
| 1,525,126 | Goldstein | Feb. 3, 1925 |
| 1,567,479 | Wilhelmi | Dec. 29, 1925 |
| 1,680,823 | Teed | Aug. 14, 1928 |
| 2,168,243 | Rollmann | Aug. 1, 1939 |
| 2,266,831 | Tegarty | Dec. 23, 1941 |
| 2,452,382 | Long | Oct. 26, 1948 |
| 2,470,089 | Booth | May 17, 1949 |

FOREIGN PATENTS

| Number | Country | Date |
|---|---|---|
| 321,009 | Great Britain | Oct. 31, 1929 |